Nov. 7, 1933.  W. G. CHRISTOPHERSON  1,933,705
METHOD OF MAKING CONNECTERS
Original Filed April 3, 1930
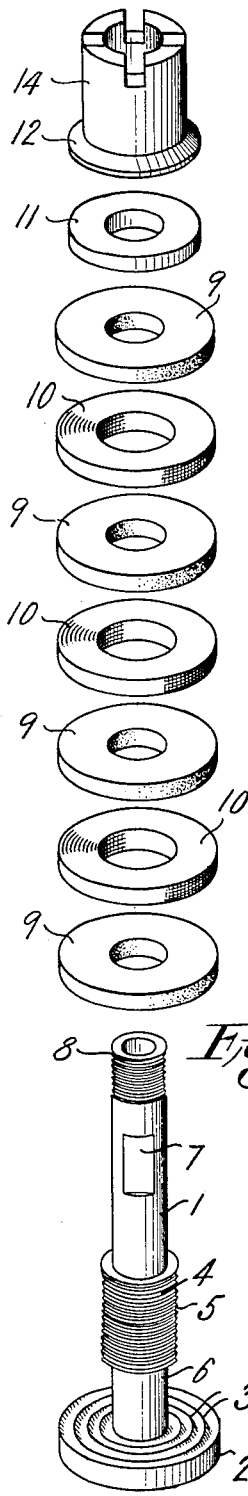
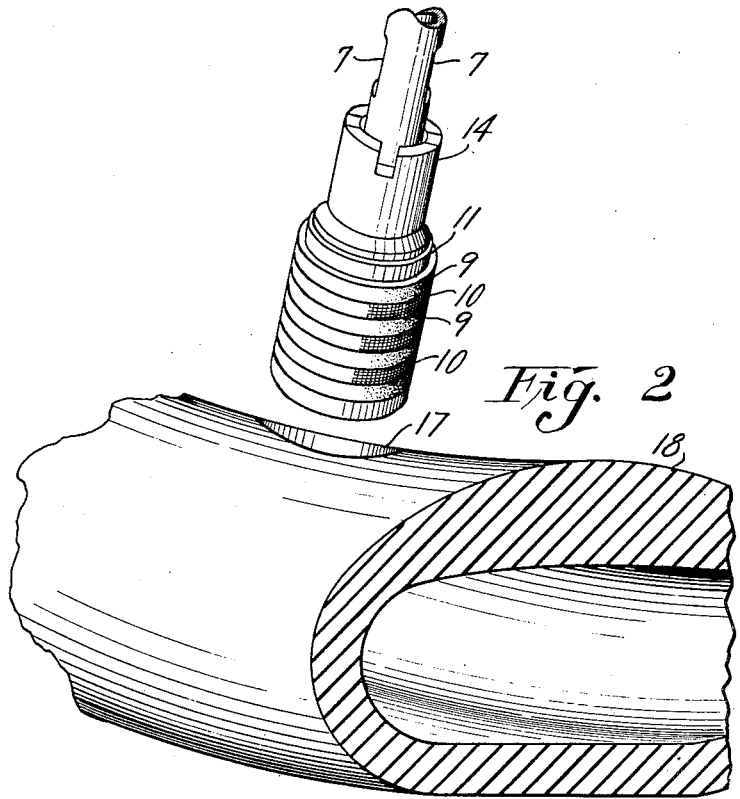
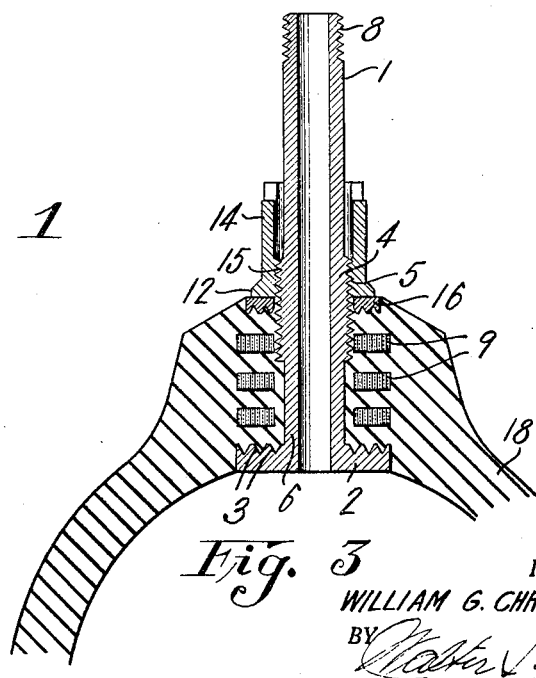
INVENTOR.
WILLIAM G. CHRISTOPHERSON
BY
ATTORNEYS.

Patented Nov. 7, 1933

1,933,705

UNITED STATES PATENT OFFICE 1,933,705

METHOD OF MAKING CONNECTERS

William G. Christopherson, Grosse Pointe Park, Mich., assignor to Morgan & Wright, Detroit, Mich., a corporation of Michigan Original application April 3, 1930, Serial No. 441,267. Divided and this application June 10, 1932. Serial No. 616,379

2 Claims. (Cl. 154—14)

This application is a division of my prior application Serial No. 441,267, filed April 3, 1930.

My invention relates to connecters and methods of making the same, and particularly to connecters secured to bodies of resilient material and methods of making the same. One example of the application of my invention is in securing stems in openings in bodies of rubber, such as curing bags and the like, although it is to be understood that the invention may be otherwise embodied and practiced.

In securing bodies of foreign material to many thermoplastic and/or yieldable substances, such as gums, rosins, compounds and combinations thereof, and the like, difficulty has heretofore been experienced in securing a bond between the foreign material and the material to which it is secured, which bond prevents leakage. Efforts have been made to apply mechanical pressure at such connections, but the application of pressure to such materials often results in a flow of the material away from the embedded or connected member which movement tends to enlarge the opening surrounding the foreign body. To overcome this tendency of the opening to increase in size, the foreign body is usually so treated that the substance in which it is embedded adheres directly to the outer surfaces thereof and prevents subsequent relative movement between the thermoplastic and/or yieldable material and the embedded body. Where the embedded body is utilized in handling the body of thermoplastic and/or yieldable material, the connecter is subjected to rather severe usage, which tends to pull it away from the material to which it is connected if an adhesive bond between the body and the material is relied upon. An example of this problem is found in the insertion of valve stems in rubber tubes such as tire curing bags.

I provide a connection in which the connecter is provided with bodies or layers of different materials, some of which will merge with the body of the thermoplastic and/or yieldable material in which they are embedded and others of which retain their shape and serve as anchors for the connecter after a treatment which merges the thermoplastic and/or yieldable material with the mergeable material inserted with the connecter. During the merging or treating operation, the material which retains its shape is firmly embedded around the opening in which the connecter is placed and subsequently serves to prevent enlargement of the opening. This construction permits the application of mechanical pressure to opposite surfaces of the material adjacent the connecter to provide a tight joint at the connecter without reliance upon an adhesion between the material of the connecter and the surrounding body. By maintaining the mechanical pressure applied to the faces of the finished joint, the joint is kept in a tight condition. For providing such pressure, the connecter is preferably threaded for cooperation with a clamping nut.

The accompanying drawing illustrates a present preferred embodiment of the invention and method of practicing the same, in which:

Fig. 1 is an exploded view of the component parts of the connecter before assemblage;

Fig. 2 is a perspective view of the assembled connecter preparatory to its insertion into an opening in a body of yieldable material; and Fig. 3 is a cross sectional view of a completed connecter.

Referring to the drawing, a member to be attached to a body of thermoplastic and/or yieldable material is illustrated in the form of a connecter stem 1 which is preferably made hollow for the passage of air or other fluid. It is to be understood that a valve mechanism (not shown) may be mounted in the connecter, if desired. The connecter is provided at one end with a flange 2 having corrugations 3 facing in the direction of the longitudinal axis of the connecter. The corrugations 3 are adapted to engage and clamp the adjacent material in the finished connecter. A portion 4 of the connecter 1 of a greater diameter than the stem is provided with threads 5. The threads 5 are spaced a distance from the flange 2 to provide an indented portion 6 therebetween, which is afterward filled with finished and treated material. If desired, a face 7 may be provided for holding the connecter during subsequent operation. The upper end of the connecter is provided with threads 8 for the reception of a cap, pipe line, or the like.

The connecter is assembled with a plurality of alternate layers 9 and 10 of materials having different characteristics. The layers are illustrated in the form of washers surrounding the connecter. The washers 9 are composed of a material which merges or joins with the body of thermoplastic and/or yieldable material to which the connecter is attached. In the case of attaching a connecter to an opening in a body of rubber, the washers 9 may be made of rubber. The washers 10 are of a material which retains its shape and tenacity during the treating operation, such as vulcanizing. Spiral rolls of rubberized fabric are suitable for the washers 10.

The washers may be externally coated with rubber or other suitable cement, if desired, as well as between the convolutions of the spiral. The diameter of the openings in the washers 9 and 10 are such as to pass over the threads 5 and leave a space between their inner peripheries and the portion 6 of the connecter. A metallic washer 11 is placed at the top of the pile of washers for engagement by a flange 12 of a nut 14 having threads 15 for engaging the threads 5. The washer 11 may be provided with corrugations 16 similar to the corrugations 3.

Referring to Fig. 2, after the connecter and the washers 9, 10 and 11 are assembled and secured by the nut 14, they are inserted in an opening 17 in a body of thermoplastic and/or resilient material 18, here illustrated in the form of a rubber tire-curing bag. It is to be understood that the rubber bag shown is by way of example and not a limitation of the invention, as the invention may be applied to many types of thermoplastic and/or resilient materials such as gums, rosins, and compounds and combinations thereof, other than rubber. After the connecter and assembled washers are in place in the opening 17, the nut 14 is screwed down to expand the washers in the opening 17 and secure the assembled connecter in place. Thereafter, the assembled body 18 and connecter are subjected to a treatment which causes the washers 9 to merge and lose their identity with the material of the body 18. In the case of rubber, the treating is a vulcanizing operation. As the washers 9 are merged with the body 18, the washers 10 are anchored in the body. The coating between the convolutions of the fabric, when used, is also anchored. The space between the inner peripheries of the washers 9 and the portion 6 of the stem is filled with the merged material which does not necessarily have to be bonded to the stem, as a tight joint may be secured by the application of pressure from the nut 14 through the washers 16 and 10 against the flange 2. The presence of the embedded washers 10 prevents the enlargement of the opening in which the stem 1 is embedded while providing flexibility.

The washer 14 may be shaped to cooperate with external clamping means, such as mold rings or the like, for holding the body 18 in place. In the case of tire curing bags, clamping rings engaging the flange 12 prevent undue distortion at the stem area from pressure within the curing bag.

As the body 18 is used, the nut 14 may be tightened occasionally to increase the pressure on the embedded washers 10 and preserve a tight joint around the connecter stem 1. Corrugations 3 and 16 are impressed into the body 18 and provide a tight seal at the edges of the joint. Similarly the thermoplastic and/or yielding material is forced into engagement with the threads 5. During such clamping operations, the stem 1 is free to have a slight amount of movement relative to the body 18 which would not be possible were adhesion between the material and stem relied upon for sealing the joint.

While I have shown and described the present preferred embodiment of the invention and method of practicing the same, it is to be understood that it may be otherwise embodied and practiced within the scope of the appended claims.

Having thus described my invention, what I claim and desire to protect by Letters Patent is:

1. In the method of securing a metallic stem in a body of rubber, the steps consisting in applying loosely fitting washers of rubber and fabric to the stem, placing the assembled parts in an opening in a body of rubber and treating them to anchor the fabric in the rubber.

2. In the method of securing a member in a body of material, the steps consisting in loosely applying to the member layers of material which merge with the first named material, and layers of material which remain intact when treated in the presence of the first named material, placing the member and applied layers in an opening in the first named material, applying pressure to said layers to cause them to fill the opening, and treating them to anchor said intact material and the member.

WILLIAM G. CHRISTOPHERSON.